United States Patent
Bugnon et al.

Patent Number: 6,143,067
Date of Patent: Nov. 7, 2000

[54] ISOINDOLINE PIGMENT HAVING IMPROVED LOW SHEAR DISPERSIBILITY

[75] Inventors: Philippe Bugnon, Essert; Fritz Herren, Düdingen; Michel François, Belfaux, all of Switzerland; Alastair McAlpine Marr, Hawthorn Grove, United Kingdom

[73] Assignee: Ciba Specialty Chemicals Corporation, Tarrytown, N.Y.

[21] Appl. No.: 09/229,875

[22] Filed: Jan. 13, 1999

[30] Foreign Application Priority Data

Jan. 28, 1998 [CH] Switzerland ............... 203/98

[51] Int. Cl.⁷ .................................. C09B 57/04
[52] U.S. Cl. ................ 106/498; 106/493; 106/505
[58] Field of Search ................... 106/498, 493, 106/505

[56] References Cited

U.S. PATENT DOCUMENTS

| | | | |
|---|---|---|---|
| 4,055,439 | 10/1977 | Babler et al. | 106/288 |
| 4,166,179 | 8/1979 | Lotsch | 544/296 |
| 4,480,097 | 10/1984 | Lotsch et al. | 544/296 |
| 4,645,539 | 2/1987 | Lotsch et al. | 106/494 |
| 4,845,214 | 7/1989 | Lotsch et al. | 544/250 |
| 5,084,100 | 1/1992 | Bauman | 106/495 |

FOREIGN PATENT DOCUMENTS

| | | |
|---|---|---|
| 029007 | 5/1981 | European Pat. Off. |
| 0 135 054 | 7/1984 | European Pat. Off. |
| 206281 | 12/1986 | European Pat. Off. |
| 493308 | 7/1992 | European Pat. Off. |
| 620253 | 10/1994 | European Pat. Off. |
| 2540355 | 3/1976 | Germany |
| 3622322 | 1/1987 | Germany |

OTHER PUBLICATIONS

Abstract of EP 029,007 (May 1981).
Abstract of EP 206,281 (Dec. 1986).
Derw. Publ. AN 83–770223 of SU 975757 (Nov. 1982).
Translation of Abstract of EP 0 135 054 (Mar. 1985).

*Primary Examiner*—Anthony Green
*Attorney, Agent, or Firm*—David R. Crichton

[57] ABSTRACT

A pigment composition, which comprises 70–95% by weight of a pigment of formula

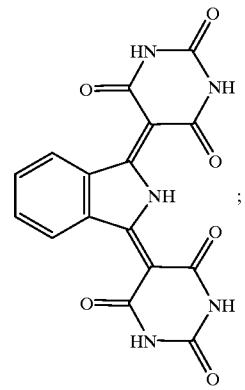

(I)

5–15% by weight of at least one $C_2$–$C_{16}$alkylenedicarboxylic acid-di-$C_1$–$C_{12}$alkyl ester; and 0–15% by weight of at least one $C_{12}$–$C_{24}$fatty acid ester of polyhydroxy-$C_2$–$C_{12}$alkane;

each based on the total weight of the pigment composition.

Also claimed is a process for the preparation of this pigment composition and its use for mass-colouring in particular high molecular weight organic materials which can be moulded as plastics or melts.

The products obtained are distinguished by an improved low shear dispersibility effect at high tinctorial strength.

26 Claims, No Drawings

ISOINDOLINE PIGMENT HAVING IMPROVED LOW SHEAR DISPERSIBILITY

The present invention relates to an isoindoline pigment coated with a alkylenedicarboxylic acid dialkyl ester and a fatty acid ester of polyhydroxy-$C_2$–$C_{12}$alkane, to its use and to a process for its preparation. The products obtained are distinguished by an improved low shear dispersibility effect at high tinctorial strength.

It is known from U.S. Pat. No. 5,084,100 that crude quinacridones can be ground in the presence of dicarboxylates. These dicarboxylates, for example diisopropyl succinate, are used as crystallising agents to prevent the quinacridones from being converted into their less stable α-phase.

EP 135 054 teaches that readily dispersible isoindoline pigments are obtained it at least 5% by weight of a carboxyl group-carrying resin, for example colophonium, are added. The pigments obtained are distinguished by markedly higher tinctorial strength in offset printing inks. It has been found, however, that the low shear dispersibility effect of pigments containing such additives is unsatisfactorily high in high molecular weight materials.

It is the object of this invention to provide a tinctorially strong isoindoline pigment having as low a low shear dispersibility effect as possible. Surprisingly, it has been possible to achieve this object with the composition described hereinafter.

This invention relates to a pigment composition, which comprises

70–95% by weight of a pigment of formula

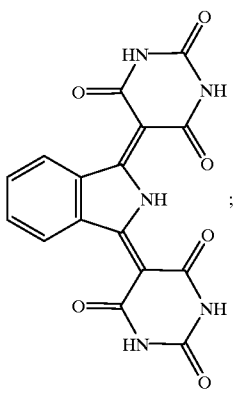

(I)

5–15% by weight of at least one $C_2$–$C_{16}$alkylenedicarboxylic acid-di-$C_1$–$C_{12}$alkyl ester; and 0–15% by weight of at least one $C_{12}$–$C_{24}$fatty acid ester of polyhydroxy-$C_2$–$C_{12}$alkane; each based on the total weight of the pigment composition.

The novel pigment compositions can comprise as additional components customary additives which are know per se, for example dispersants and/or natural or synthetic resins. These additives are preferably used in an amount of not more than 10% by weight, based on the total weight of the pigment composition.

Although the $C_{12}$–$C_{24}$fatty acid ester of polyhydroxy-$C_2$–$C_{12}$alkane need not necessarily be present in the novel pigment composition, its presence is usually very advantageous. It is preferably present in an amount of at least 1% by weight, particularly preferably of at least 2.5% by weight, based on the total weight of the pigment composition.

The pigment of formula (I) is a pigment known, for example, from DE 20 41 999 and can be prepared by any known method, for example by one of the methods indicated in DE 10 12 404, DE 10 25 080, U.S. Pat. No. 4,166,179, DE 30 22 839 or EP 424 759. According to DE 28 00 815, EP 38 548, DE 35 22 680 and DE 36 22 322, the crude pigment can be recrystallised in water, in benzoates or in mixtures thereof.

The pigment of formula (I) is preferably a crude pigment recrystallised by thermal treatment. The thermal treatment can be carried out partially or completely during or immediately after the synthesis by heating the synthesis suspension, or also as a separate step after an intermediate isolation of the thermally untreated or already partially treated crude pigment. Depending on the duration and kind of thermal treatment, the pigment is opaque or transparent and tinctorially strong, the improved dispersibility of the novel pigment compositions being remarkable especially in the case of transparent and tinctorially strong pigments.

$C_2$–$C_{16}$Alkylenedicarboxylic acids are, for example oxalic acid, malonic acid, succinic acid, glutaric acid, adipic acid, pimelic acid, subaric acid, cis- or trans-cyclohexane-1,2-dicarbo-xylic acid, cis- or trans-cyclohexane-1,4-dicarboxylic acid, azelaic acid or sebacic acid. $C_6$–$C_{12}$Alkylenedicarboxylic acids are preferred. The $C_1$–$C_{12}$alkyl of the esters is, for example, methyl, ethyl, n-propyl, isopropyl, n-butyl, isobutyl, 2-butyl, tert-butyl or one of the isomers of pentyl, hexyl, heptyl, octyl, decyl or dodecyl, preferably n-$C_2$–$C_8$alkyl, particularly preferably n-$C_2$–$C_4$alkyl, most preferably ethyl or n-butyl. $C_2$–$C_{16}$Alkylenedicarboxylic acid-di-$C_1$–$C_{12}$alkyl-esters can be used both as pure substances and in the form of their mixtures. Very particularly preferred $C_2$–$C_{16}$alkylenedicarboxylic acid-di-$C_1$–$C_{12}$alkyl esters are diethyl sebacate and/or di-n-butyl sebacate.

Polyhydroxy-$C_2$–$C_{12}$alkanes contain 2 to 12 hydroxyl groups, but preferably at most one group on each carbon atom. They may additionally be interrupted by one or more than one ether group. The number of hydroxyl groups is preferably from 2 to 5, particularly preferably 2 or 3. Polyhydroxy-$C_2$–$C_{12}$alkanes are typically ethylene glycol, propylene glycol, 1,3-propanediol, glycerol, 1,2-butanediol, 1,3-butanediol, 1,4-butanediol, 2,3-butanediol, 1,2-pentanediol, 1,3-pentanediol, 1,5-pentanediol, 2,3-pentanediol, 1,2-cyclopentanediol, 1,2-hexanediol, 1,6-hexanediol, 2,5-hexanediol, 1,2-cyclohexanediol, 1,4-cyclohexanediol, 1,7-heptanediol, 1,2,3-heptanetriol, 1,8-octanediol, 1,9-nonanediol, 1,10-decanediol, 1,2-dodecanediol or 1,12-dodecanediol. Polyhydroxy-$C_2$–$C_{12}$alkanes which are interrupted by one or more than one ether group are, for example, diethylene glycol(3-oxa-1,5-dihydroxypentane), dipropylene glycol, glucose, triethylene glycol, tripropylene glycol or polyethylene glycol 200 ($M_r$=190–210). It is preferred to use polyhydroxy-$C_2$–$C_6$alkanes, particularly preferably ethylene glycol, propylene glycol, 1,3-propanediol or glycerol, very particularly preferably glycerol.

The $C_{12}$–$C_{24}$fatty acid esters of polyhydroxy-$C_2$–$C_{12}$alkanes are known substances or substances which can be prepared in analogy to these, some of which are commercially available and are known as dispersants for pigments and fillers. A neutral partial ester is preferred. $C_{12}$–$C_{24}$Fatty acid esters of polyhydroxy-$C_2$–$C_{12}$alkanes can be used both as pure substances and in the form of their mixtures, which may also contain unesterified polyhydroxy-$C_2$–$C_{12}$alkane as secondary component. The $C_{12}$–$C_{24}$fatty acid esters of polyhydroxy-$C_2$–$C_{12}$alkanes particularly preferably have a saponification value of 100 to 200 and a free polyhydroxy-$C_2$–$C_{12}$alkane component of at most 12% by weight, very particularly preferably a saponification value of 140 to 180 and a free polyhydroxy-$C_2$–$C_{12}$alkane component of at most 10% by weight.

Preferably, both the $C_2$–$C_{16}$alkylenedicarboxylic acid-di-$C_1$–$C_{12}$alkyl esters, or their mixtures, and the $C_{12}$–$C_{24}$fatty acid esters of polyhydroxy-$C_2$–$C_{12}$alkane, or their mixtures, each have melting point of at most 40° C. $C_2$–$C_{16}$Alkylenedicarboxylic acid-di-$C_1$–$C_{12}$alkyl ester is particularly preferably mainly adsorbed on the surface of the pigment. The ratio of $C_2$–$C_{16}$alkylene-dicarboxylic acid-di-$C_1$–$C_{12}$alkyl ester to the $C_{12}$–$C_{24}$fatty acid ester of polyhydroxy-$C_2$–$C_{12}$-alkane is very particularly preferably from 2:3 to 3:2.

A preferred pigment composition is that which comprises 70–90% by weight of a pigment of formula (I);

5–15% by weight of at least one $C_2$–$C_{16}$alkylenedicarboxylic acid-di-$C_1$–$C_{12}$alkyl ester; and 5–15% by weight of at least one $C_{12}$–$C_{24}$fatty acid ester of polyhydroxy-$C_2$–$C_{12}$alkane; each based on the total weight of the pigment composition.

A particularly preferred pigment composition is that which comprises

80–90% by weight of a pigment of formula (I);

5–10% by weight of at least one $C_2$–$C_{16}$alkylenedicarboxylic acid-di-$C_{1-C12}$alkyl ester; and 5–10% by weight of at least one $C_{12}$–$C_{24}$fatty acid ester of polyhydroxy-$C_2$–$C_{12}$alkane; each based on the total weight of the pigment composition.

A very particularly preferred pigment composition is that which consists essentially of 80–90% by weight of a pigment of formula (I);

5–10% by weight of at least one $C_2$–$C_{16}$alkylenedicarboxylic acid-di-$C_{1-C12}$alkyl ester; and 5–10% by weight of at least one $C_{12}$–$C_{24}$fatty acid ester of polyhydroxy-$C_2$–$C_{12}$alkane; each based on the total weight of the pigment composition.

The novel pigment compositions described above are obtained, for example, by general processes known per se, for example by mixing one of the components, where appropriate in an inert diluent or solvent. Surprisingly, however, it has been found that it is particularly advantageous to employ the process described below for the preparation of the novel pigment compositions.

This invention therefore also relates to a process for the preparation of a novel pigment composition by thermal treatment of a dispersion of a pigment of formula (I) in an inert hydrophilic diluent, which process comprises adding 1) at least one $C_2$–$C_{16}$alkylenedicarboxylic acid-di-$C_1$–$C_{12}$alkyl ester, at the latest before the end of the thermal treatment; and 2) where appropriate, at least one $C_{12}$–$C_{24}$fatty acid ester of polyhydroxy-$C_2$–$C_{12}$alkane, at the earliest after the addition of the $C_2$–$C_{16}$alkylenedicarboxylic acid-di-$C_{1-C12}$alkyl ester has been started and after the start of the thermal treatment.

This process is particularly suitable for the preparation of the preferred novel pigment compositions.

Processes which can be used in general and apparatus for the preparation of a pigment dispersion in a hydrophilic solvent are known to the skilled person. The starting material is preferably a crude pigment which is not dried. This pigment may be used, for example, in the form of a moist press cake, e.g. one having a residual moisture of 5 to 60% by weight, preferably of 20 to 40% by weight. The mixture resulting from the reaction taking place in the course of the preparation of the pigment can also be further used directly.

The inert hydrophilic diluent can be water or any solvent, in 100 ml of which 10 g $H_2O$ are completely soluble, for example di-$C_{1-C4}$alkylformamide, di-$C_{1-C4}$alkylacetamide or $C_{1-C4}$-alcohol, preferably water, ethanol, isopropanol or n-butanol or a mixture thereof, very particularly preferably water. The amount of inert diluent is conveniently from 50 to 2000% by weight, preferably from 200 to 800% by weight, based on the dry weight of the pigment.

The thermal treatment is preferably carried out at a temperature in the range from 60 to 140° C., with or without pressure. Depending on diluent, temperature, desired coloristic qualities and batch size, the treatment time is preferably in the range from about 10 min to 100 hours, the treatment time usually being shortened by higher temperature, a more polar diluent and/or higher transparency requirements. Treatment is particularly preferably carried out for 1 to 20 hours at 80 to 100° C.

The thermal treatment may be carried out in neutral or acid medium. It is preferably carried out in the pH range from 2 to 5. The pigment composition can then be further processed in customary manner, for example filtered, if necessary washed, dried and, where necessary, sieved.

Both the $C_2$–$C_{16}$alkylenedicarboxylic acid-di-$C_{1-C12}$alkyl ester and the $C_{12}$–$C_{24}$fatty acid ester of polyhydroxy-$C_2$–$C_{12}$alkane can be added, for example, in liquid form or as dispersions, preferably in the form of aqueous dispersions. The addition can be carried out all at once, in portions or continuously, and where necessary it can be carried out already during or before the chemical preparation of the pigment.

Preferably, the entire amount of $C_2$–$C_{16}$alkylenedicarboxylic acid-di-$C_1$–$C_{12}$alkyl ester is added at the latest by that time which corresponds to 90% of the entire time of the thermal treatment. The $C_{12}$–$C_{24}$fatty acid ester of polyhydroxy-$C_2$–$C_{12}$alkane is preferably added at the earliest from that point in time at which at least 5% by weight of the $C_2$–$C_{16}$alkylenedicarboxylic acid-di-$C_{1-C12}$alkyl ester have been added, preferably after its complete addition. The $C_{12}$–$C_{24}$fatty acid ester of polyhydroxy-$C_2$–$C_{12}$alkane is particularly preferably added only when at least 10% of the entire time of the thermal treatment has been reached, very particularly preferably only at the end of the thermal treatment.

The novel pigments are excellently suitable for mass-colouring high molecular weight organic material.

High molecular weight organic materials which can be coloured or pigmented with the novel pigments are, for example, cellulose ethers and esters, typically ethyl cellulose, nitrocellulose, cellulose acetate, cellulose butyrate, natural resins or synthetic resins, for example polymerisation resins or condensation resins, typically aminoplasts, phenolic plastics, polycarbonates, polyolefins, polystyrene, polyvinyl chloride, polyamides, polyurethanes, polyester, ABS, polyphenylene oxides, rubber, casein, silicone and silicone resins, singly or in mixtures.

The indicated high molecular weight organic compounds can be used singly or as mixtures in the form of plastics, melts or in the form of spinning solutions. Because of their low shear dispersibility effect is low, the novel pigments may be preferably used in high molecular weight organic materials which are moulded (mechanically processed) as plastics or melts at elevated temperature.

Depending on the end use requirement, it is expedient to use the novel pigments as toners or in the form of preparations, for example as masterbatches.

The novel pigments can be used in an amount of 0.01 to 30% by weight, preferably of 0.1 to 10% by weight, based on the high molecular weight organic material to be pigmented.

The pigmenting of the high molecular weight organic substances with the novel pigments is effected, for example, by admixing such pigments by themselves or in the form of master-batches to these substrates using roll mills, mixing or milling apparatus. The pigmented material is then brought into the desired final form by methods which are known per se, for example calendering, moulding, extruding or injection moulding. It is often desirable to incorporate so-called plasticisers into the high molecular weight compounds before moulding, in order to produce non-brittle mouldings or to diminish their brittleness. Suitable plasticisers are typically esters of phosphoric acid, phthalic acid or sebacic acid. The plasticisers may be incorporated into the novel pigments before or after working the pigments into the polymers. To obtain different shades, it is also possible to add to the high molecular weight organic materials fillers or other chromophoric components such as white, coloured or black pigments in any amount, in addition to the novel pigments.

The novel pigments are particularly suitable for colouring plastics, preferably polyvinyl chloride and polyolefins, in particular polypropylene. The novel pigments are very particularly suitable for colouring synthetic fibres, in particular polypropylene fibres.

When used for colouring e.g. polyvinyl chloride or polyolefins, the novel pigments are distinguished by good allround fastness properties, such as good fastness to migration, heat, light and weathering and also by good opacity and high tinctorial strength and, in particular, by good dispersibility at a particularly low shear dispersibility effect.

Accordingly, this invention also relates to a process for mass-colouring high molecular weight organic material, which comprises admixing to the high molecular weight organic material from 0.01 to 30% by weight of a novel pigment composition. The pigment is conveniently admixed before the high molecular weight organic material is moulded. A particularly preferred process is that, wherein the high molecular weight organic material is in the form of a plastic or melt when being moulded, for example at a temperature in the range from 100 to 350° C., preferably from 150 to 330° C., particularly preferably from 150 to 300° C. for plastics and from 250 to 330° C. for melts.

The following non-limitative Examples illustrate the invention in more detail.

EXAMPLE 1

A mixture of 62 g of barbituric acid, 33.5 g of 1,3-diiminoisoindoline and 55 ml of glacial acetic acid in 1100 ml of water is stirred for 1 hour at 25° C. The resulting pigment suspension is then heated to 90° C., stirred for 10 hours, filtered and washed with water. 275 g of this 31% water-moist press cake isoindoline pigment (C.I. Pigment Yellow 139) are dispersed in 800 g of water using a high-speed stirrer (IKA-Ultra-Turrax® T45, 3-blade propeller, diameter 35 mm; Janke & Kunkel GmbH, Staufen) for 2 hours at 5000–6000 rpm. Subsequently, 142 g of a 6% emulsion of diethyl sebacate in water (nonionic surfactant as assistant) are added over 1 min. The pH is adjusted to 2 with 2M-HCl. After 2 hours, the suspension is heated to 90° C., at which temperature it is then kept for another 5 hours. The mixture is cooled to 50° C. and then 8.5 g of Loxiol® EP 10 (neutral partial fatty acid ester of polyhydroxy-$C_2$–$C_{12}$alkane having a saponification value of 158–170 and <8% of free glycerol /Henkel) are added and the mixture is stirred for another 5 hours at 50° C. The residue is washed with water, dried at 80° C./160 mbar and powdered.

EXAMPLE 2

400 ml of water, 20 ml of glacial acetic acid, 22.54 g of barbituric acid, 12.2 g of 1,3-diiminoisoindoline and 3 g of diethyl sebacate are stirred for 1 hour at 25° C. in a 1.5 liter vessel. The resulting pigment suspension is then heated to 90° C. and stirred for 15 hours. Subsequently, the heating is turned off and, after addition of 3.0 g Loxiol® EP 10, the suspension is stirred for another 2 hours, the temperature dropping to 50° C. The suspension is then filtered and the residue is washed with water, dried at 80° C. /160 mbar and powdered.

EXAMPLE 3

400 ml of water, 20 ml of glacial acetic acid, 22.54 g of barbituric acid, 12.2 g of 1,3-diiminoisoindoline and 3 g of diethyl sebacate are stirred for 1 hour at 25° C. in a 1.5 liter vessel. The resulting pigment suspension is then heated to 90° C. and stirred for 15 hours. Subsequently, the heating is turned off and the suspension is stirred for another 2 hours, the temperature dropping to 50° C. The suspension is then filtered and the residue is washed with water, dried at 80° C./160 mbar and powdered.

EXAMPLE 4

The general procedure of Example 2 is repeated, but replacing diethyl sebacate with the same amount of di-n-butyl sebacate.

EXAMPLE 5

The general procedure of Example 4 is repeated, but using 4 g of di-n-butyl sebacate.

EXAMPLE 6

The general procedure of Example 2 is repeated, but using 2 g of diethyl sebacate.

EXAMPLES 7–10

The general procedures of Examples 2, 4, 5 and 6 are repeated, but using in each case 2.0 g Loxiol® EP 10.

EXAMPLES 11–14

The general procedures of Examples 2, 4, 5 and 6 are repeated, but using in each case 4.0 g Loxiol® EP 10.

EXAMPLE 15

0.04 g of the pigment composition of Example 1 is mixed with 13.3 g of polyvinyl chloride (PVC Evipol® SH 7020, EVC GmbH, Frankfurt a.M.), 1 g of $TiO_2$ and 7.3 ml of a masterbatch consisting of 92.21% by weight of diisodecyl phthalate (Vestinol®, Hüls Chemie)

3.60% by weight of heat stabilisers based on barium zinc carboxylate (Irgastab® BZ 561, Ciba Spezialitatenchemie AG) and 4.19% of epoxidised soybean oil (Rheoplast® 39, Ciba Spezialitatenchemie AG).

After a wetting time of 30 minutes, the mixture is processed on a roll mill for 8 minutes at a roll temperature of 165° C. to a thin, tinctorially strong yellow film.

EXAMPLE 16

The general procedure of Example 15 is repeated, but first processing the mixture on a roll mill for 8 minutes at a roll temperature of 100° C. and only then for 8 minutes at a roll temperature of 165° C., to a thin film which is very similar in colour to that of Example 15 (small low shear dispersibility effect).

EXAMPLES 18–43

The general procedures of Examples 15 and 16 are repeated, but replacing the product of Example 1 with the products of Examples 2–14. The low shear dispersibility effect of all these products is satisfactory.

EXAMPLE 44

400 g of polypropylene granules (Daplen® PT-55, Chemie LINZ) and 4 g of the pigment obtained according to Example 4 are vigorously mixed in a mixer drum. The granules thus treated are then spun by the melt spinning process at 260–285° C., resulting in yellow fibres having good textile properties.

EXAMPLES 45–57

The general procedure of Example 44 is repeated, but replacing the product of Example 4 in each case with another product according to Examples 1–3 or 5–14.

What is claimed is:

1. A pigment composition, which comprises
70–95% by weight of a pigment of formula

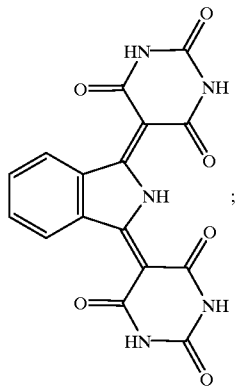

(I)

5–15% by weight of at least one $C_2$–$C_{16}$alkylenedicarboxylic acid-di-$C_1$–$C_{12}$alkyl ester; and
0–15% by weight of at least one $C_{12}$–$C_{24}$fatty acid ester of polyhydroxy-$C_2$–$C_{12}$alkane; each based on the total weight of the pigment composition.

2. A pigment composition according to claim 1, wherein the $C_2$–$C_{16}$alkylenedicarboxylic acid-di-$C_{1-C12}$alkyl ester is an n-$C_2$–$C_8$alkyl ester of a $C_6$–$C_{12}$alkylenedicarboxylic acid.

3. A pigment composition according to claim 2, wherein the n-$C_2$–$C_8$alkyl ester of a $C_6$–$C_{12}$-alkylenedicarboxylic acid is diethyl sebacate, di-n-butyl sebacate or a mixture thereof.

4. A pigment composition according to claim 1, wherein the $C_{12}$–$C_{24}$fatty acid ester of polyhydroxy-$C_2$–$C_{12}$alkane is a neutral partial ester having a saponification value from 100 to 200 and a free polyhydroxy-$C_2$–$C_{12}$alkane component of at most 12% by weight.

5. A pigment composition according to claim 1, wherein the $C_{12}$–$C_{24}$fatty acid ester of polyhydroxy-$C_2$–$C_{12}$alkane is an ester of an alkane substituted by 2 to 5, hydroxyl groups.

6. A pigment composition according to claim 5, wherein the polyhydroxy-$C_2$–$C_{12}$alkane is polyhydroxy-$C_2$–$C_6$alkane.

7. A pigment composition according to claim 1, wherein $C_2$–$C_{16}$alkylenedicarboxylic acid-di-$C_1$–$C_{12}$alkyl ester is adsorbed on the pigment.

8. A pigment composition according to claim 1, wherein the $C_2$–$C_{16}$alkylenedicarboxylic acid-di-$C_{1-C12}$alkyl ester and the $C_{12}$–$C_{24}$fatty acid ester of polyhydroxy-$C_2$–$C_{12}$alkane [is] are present in a weight ratio of from 2:3 to 3:2.

9. A pigment composition according to claim 1, which comprises
70–90% by weight of a pigment of formula (I);
5–15% by weight of at least one $C_2$–$C_{16}$alkylenedicarboxylic acid-di-$C_1$–$C_{12}$alkyl ester; and
5–15% by weight of at least one $C_{12}$–$C_{24}$fatty acid ester of polyhydroxy-$C_2$–$C_{12}$alkane; each based on the total weight of the pigment composition.

10. A pigment composition according to claim 9, which comprises
80–90% by weight of a pigment of formula (I);
5–10% by weight of at least one $C_2$–$C_{16}$alkylenedicarboxylic acid-di-$C_1$–$C_{12}$alkyl ester; and
5–10% by weight of at least one $C_{12}$–$C_{24}$fatty acid ester of polyhydroxy-$C_2$–$C_{12}$alkane; each based on the total weight of the pigment composition.

11. A pigment composition according to claim 5 wherein the $C_{12}$–$C_{24}$fatty acid ester of polyhydroxy-$C_2$–$C_{12}$alkane is an ester of an alkane substituted by 2 or 3 hydroxyl groups.

12. A pigment composition according to claim 5, wherein the polyhydroxy-$C_2$–$C_{12}$alkane is ethylene glycol, propylene glycol, 1,3-propanediol or glycerol.

13. A pigment composition according to claim 12, wherein the polyhydroxy-$C_2$–$C_{12}$alkane is glycerol.

14. A composition comprising a high molecular weight organic material and from 0.01 to 30% by weight of a pigment according to claim 1.

15. A composition according to claim 14, wherein the high molecular weight organic material is polyvinyl chloride.

16. A composition according to claim 14, wherein the high molecular weight organic material is a synthetic polymer in the form of a fibre.

17. A composition according to claim 14, wherein the high molecular weight organic material is a polyolefin.

18. A composition according to claim 17, wherein the high molecular weight organic material is polypropylene.

19. A composition according to claim 14, which comprises from 0.1 to 10% by weight of a pigment according to claim 1.

20. A process for mass-colouring high molecular weight organic material, which comprises admixing to the high molecular weight organic material from 0.01 to 30% by weight of a pigment composition according to claim 1.

21. A process according to claim 20, further comprising moulding the high molecular weight organic material with the admixed pigment composition at a moulding temperature of from 100 to 350° C., whereby the high molecular weight organic material is plastic or molten.

22. A process according to claim 21, wherein the moulding temperature is in the range from 150 to 330° C.

23. A process for the preparation of a novel pigment composition by thermal treatment of a dispersion of a pigment of formula

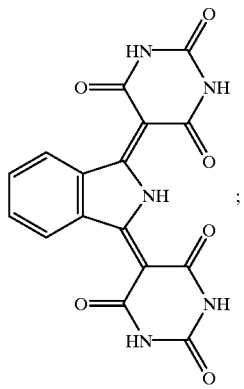

(I)

at least one $C_2$–$C_{16}$alkylenedicarboxylic acid-di-$C_1$–$C_{12}$alkyl ester: and at least one $C_{12}$–$C_{12}$fatty acid ester of polyhydroxy-$C_2$–$C_{12}$alkane; in an inert hydrophilic diluent, which comprises adding 1) at least one $C_2$–$C_{16}$alkylenedicarboxylic acid-di-$C_{1-C12}$alkyl ester, at the latest before the end of the thermal treatment; and 2) when its quantity is more then 0% by weight, at least one $C_{12}$–$C_{24}$fatty acid ester of polyhydroxy-$C_2$–$C_{12}$alkane, at the earliest after the start of the thermal treatment, whereby the addition of the $C_2$–$C_{16}$alkylenedicarboxylic acid-di-$C_1$–$C_{12}$alkyl ester is started before the addition of the $C_{12}$–$C_{22}$fatty acid ester of polyhydroxy-$C_2$–$C_{12}$alkane is started, and the amount of pigment of formula (I) is 70–95% by weight, the amount of $C_2$–$C_{16}$alkylenedicarboxylic acid-di-$C_1$–$C_{12}$alkyl ester is 5–15% by weight, and the amount of $C_{12}$–$C_{24}$fatty acid ester of polyhydroxy-$C_2$–$C_{12}$alkane is 0–15% by weight, each based on the total weight of pigment of formula (I), $C_2$–$C_{16}$alkylenedicarboxylic acid-di-$C_1C_{12}$alkyl-ester and $C_{12}$–$C_{24}$fatty acid ester of polyhydroxy-$C_2$–$C_{12}$alkane.

24. A process according to claim 23, wherein the inert diluent is used in an amount of from 50 to 2000% by weight, based on a dry weight of the pigment.

25. A process according to claim 23, wherein the thermal treatment is carried out at a temperature of 60 to 140° C. for from 10 min to 100 hours.

26. A process according to claim 24, wherein the amount of inert diluent is from 200 to 800% by weight, based on the dry weight of the pigment.

* * * * *

UNITED STATES PATENT AND TRADEMARK OFFICE
CERTIFICATE OF CORRECTION

PATENT NO. : 6,143,067
DATED : NOVEMBER 7, 2000
INVENTOR(S) : PHILIPPE BUGNON ET AL.

It is certified that error appears in the above-identified patent and that said Letters Patent is hereby corrected as shown below:

on the title page, Section [75] should read:

-- [75]  Inventors: Philippe Bugnon, Essert; Fritz Herren, Düdingen; Michel François, Belfaux, all of Switzerland; Alastair McAlpine Marr, Paisley, United Kingdom Signed and Sealed this Eighth Day of May, 2001

*Attest:*

NICHOLAS P. GODICI

*Attesting Officer*     *Acting Director of the United States Patent and Trademark Office*